UNITED STATES PATENT OFFICE.

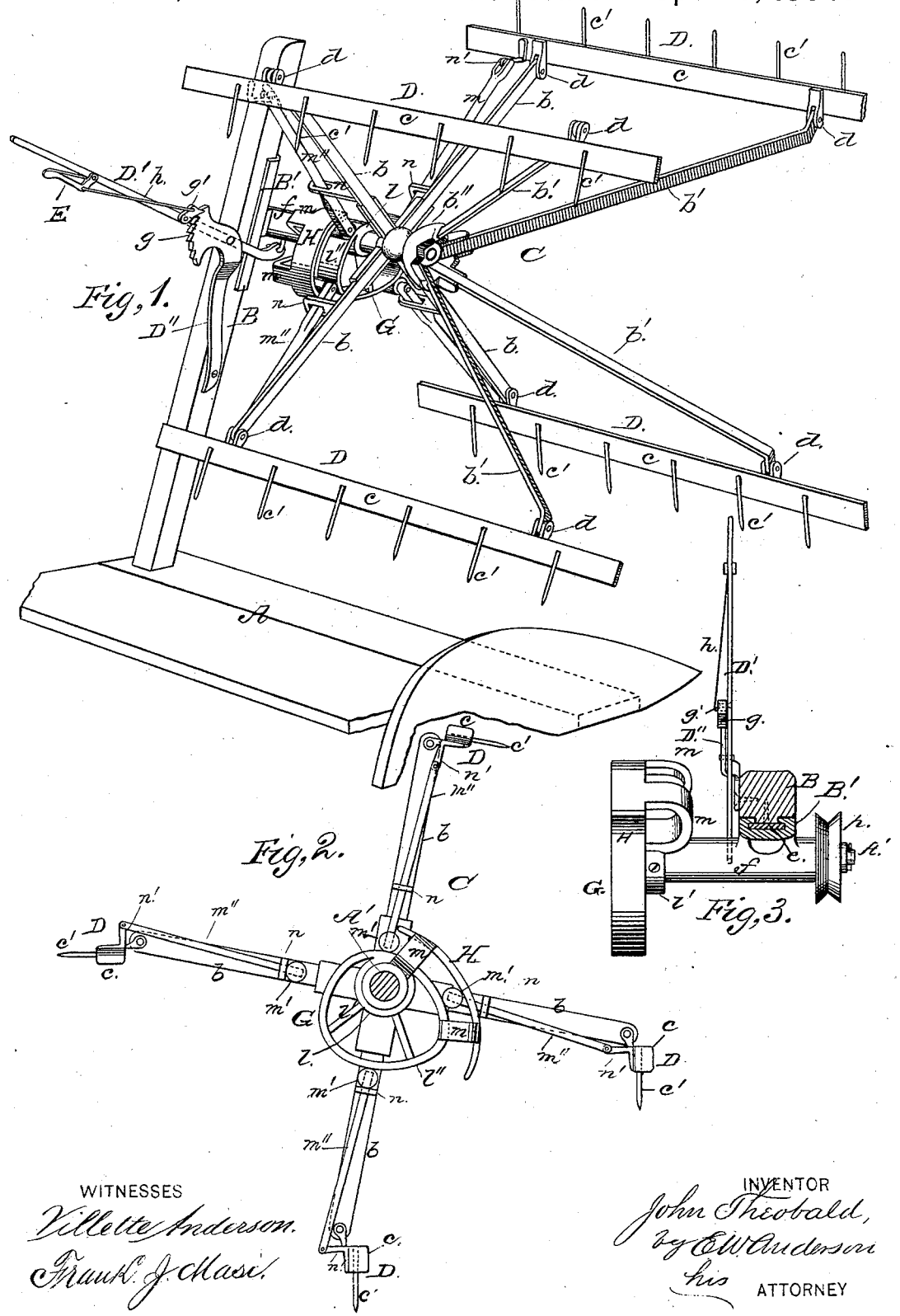

JOHN THEOBALD, OF ARCHBOLD, OHIO.

HARVESTER-REEL.

SPECIFICATION forming part of Letters Patent No. 232,155, dated September 14, 1880.

Application filed May 1, 1880. (No model.)

*To all whom it may concern:*

Be it known that I, JOHN THEOBALD, of Archbold, in the county of Fulton and State of Ohio, have invented a new and valuable Improvement in Grain-Reels; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my improved grain-reel. Fig. 2 is a side view thereof, and Fig. 3 is a detail.

This invention has relation to improvements in harvester-rakes; and it consists in means, substantially as hereinafter shown, whereby the rakes are brought down into the grain in such a position as to raise the downbeaten or lying stalks and present them to the knives in proper position to be cut thereby, and which drop the cut stalks when the rakes pass beyond their operating point, as will be hereinafter more fully set forth.

In the annexed drawings, the letter A designates the platform of a harvester, having erected thereon at one side the post B, in which the reel C has its bearings. This reel is composed of a shaft, A′, a hub, b″, fixed thereon and having the obliquely-radiating spokes b′ and the spokes b at right angles to the axis of rotation of the hub.

D indicates the rakes, consisting, essentially, of a head, c, and teeth c′, projecting therefrom. The heads c are pivoted to the ends of the spokes b b′ by means of the forked arms d, and the rakes thus have free vibration, with the ends of the said spokes as a pivot.

Secured in any suitable manner to the front side of post B is a T-shaped rail, e, upon which is passed a slide, B′, which thus has vertical movement. This slide has formed thereon a horizontal tubular bearing, f, in which the shaft A′ of the reel has its bearings, and it is raised or lowered, thus adjusting the reel to work in grain of different heights, by means of a lever, D′, having its bearing in a standard, D″, on the said post, and carrying a pawl, g′, engaging a segmental rack, g, on the upper end of said standard.

The pawl holds the slide to its adjustment when engaged with the rack, and is lifted out of engagement therewith by means of an angle-lever, E, having its fulcrum on the lever D′, and connected to the pawl by means of the rod h.

G indicates a cam, consisting, essentially, of a hub, l, spokes l′, and an oval rim, l″. This cam is passed over the end of the bearing f, and is fixed thereto by means of a screw. Projecting from the hub or rim of the cam are arms m, to the ends of which is secured a curved guard, H, arranged parallel to the contiguous face of the cam, with a space between the rim and said guide sufficiently wide to admit the anti-friction rollers m′ on the ends of the connecting-rods m″. The rods extend through guides n on the spokes of the reel, and have slight endwise play through the said guides. Their free ends are pivoted to arms n′, projecting at right angles to the rake-heads.

When the rakes are about to enter the grain the heads swing upon their pivots and draw the anti-friction rollers m′ away from the cam, owing to the slight endwise motion of the rods m″ through their guides n, and upon entering the grain they are vertical, or nearly so. This position is maintained while pressing the grain against the cutter-bar by the locking action of the rods m″, arms n′, and the guides; but when the rakes begin to rise out of the grain the rollers enter the space between the cam and guard, and the rakes are turned so that the grain drops readily from their teeth upon the platform, instead of being carried up and over the reel. The rotation continuing, the cam, through the rollers and connecting-rods, throws the head edgewise or tangential to the circle described by the ends of the spokes, the rakes thus meeting with the minimum of resistance.

Motion is given to the reel through a pulley-wheel, p, on the end of its shaft.

What I claim as new, and desire to secure by Letters Patent, is—

1. In a harvester-rake, the combination, with the reel-frame having the pivoted rakes D, of the endwise-movable connecting-rods m″, the guides *n*, the anti-friction rollers *m'*, and a cam, G, having the guard H fixed thereto, substantially as specified.

2. The combination, with the post B, the sleeve *f*, fixed thereto and provided with the cam G, having the guard H, and the reel C, journaled in said sleeve and provided with the hinged rake-heads D, of the guides *n* on the reel-spokes, the endwise-movable connecting-rods *m''*, extending through said guides and pivoted to arms *n'* of said heads *c*, and the friction-rollers *m'* on the ends of said rods, substantially as specified.

In testimony that I claim the above I have hereunto subscribed my name in the presence of two witnesses.

JOHN THEOBALD.

Witnesses:
 JOHN R. HOFFMIRE,
 AARON LININGER.